April 30, 1968 V. J. COX 3,381,204

HIGH VOLTAGE RECTIFIERS

Filed March 28, 1966 6 Sheets-Sheet 1

*Inventor*
Victor James Cox

By
*Attorney*

April 30, 1968 V. J. COX 3,381,204

HIGH VOLTAGE RECTIFIERS

Filed March 28, 1966 6 Sheets-Sheet 2

Inventor
Victor James Cox

By
Brown, Schuyler & Beveridge
Attorney

Inventor
Victor James Cox
By
Browne, Schuyler & Beveridge
Attorney

April 30, 1968 V. J. COX 3,381,204

HIGH VOLTAGE RECTIFIERS

Filed March 28, 1966 6 Sheets-Sheet 4

Inventor
Victor James Cox

By
Browne, Schuyler & Beveridge
Attorney

*Inventor*
Victor James Cox
By
Brown Schuyler & Beveridge
Attorney

April 30, 1968 V. J. COX 3,381,204

HIGH VOLTAGE RECTIFIERS

Filed March 28, 1966 6 Sheets-Sheet 6

Inventor
Victor James Cox

By
Browne, Schuyler & Beveridge
Attorney

United States Patent Office 3,381,204

Patented Apr. 30, 1968

3,381,204

HIGH VOLTAGE RECTIFIERS

Victor J. Cox, Southend-on-Sea, Essex, England, assignor to E. K. Cole Limited, Southend-on-Sea, England Filed Mar. 28, 1966, Ser. No. 538,072
Claims priority, application Great Britain, Mar. 27, 1965, 13,086/65; Apr. 2, 1965, 13,976/65
12 Claims. (Cl. 321—15)

This invention relates to high voltage low current rectifier systems for operation at high frequency (e.g. 50 kc./s.) of the type using the well known Cockcroft/Walton principle.

In such system since the transformer peak A.C. output voltage is a fairly small fraction of the final output, the transformer ratio is smaller than that required for a simple half or full wave rectifier system. This means that a given total secondary circuit stray capacity reflects a smaller capacity in shunt with the primary circuit. This has a beneficial effect on efficiency as the $I^2R$ winding loss arising from this capacitative current and the loss associated with the stray capacity itself may well exceed the total useful rectified output power.

The disadvantage of known forms of such system is that the stray capacity asosciated with the capacitors and wiring required for a Cockcroft/Walton chain increases the secondary circuit shunt capacity. The inclusion of these capacitors increases the size, cost and weight of the rectifier assembly. In addition because each capacitor supplies the load current for all succeeding rectifiers in the chain it is either necessary to limit the number of rectifier stages in the chain or to use inconveniently large values of capacitor to avoid poor voltage regulation.

The present invention is a transformer fed rectifier system of the said type, so designed that the interwinding capacities of the transformer form a substantial part or all of the coupling and/or reservoir capacitances. The transformer designed for use in the system also permits a particularly low value of effective shunt capacity to be realised. Because each stage in the rectifier chain is fed from a separate secondary winding, the rectifier system voltage regulation does not degrade as rapidly when the number of rectifier stages is increased.

The above and other features of the invention will be more readily understood by a perusal of the following description having reference to the accompanying drawings in which.

Figure 1:
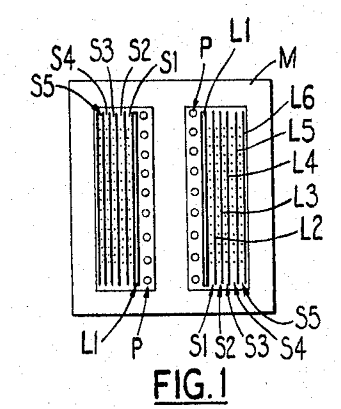
FIGURE 1 is a schematic view of a transformer used in the invention.
Figure 4:
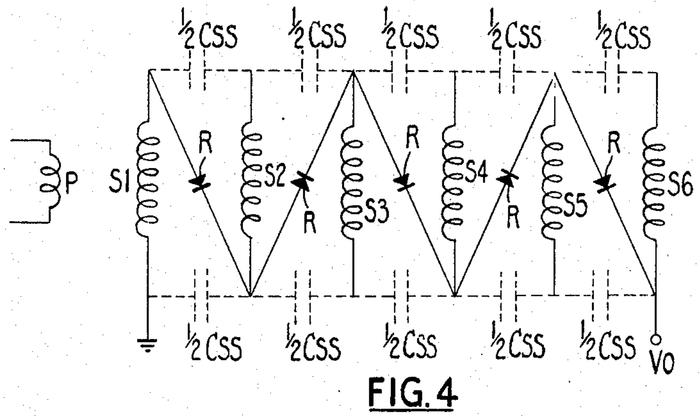
Figure 3A:
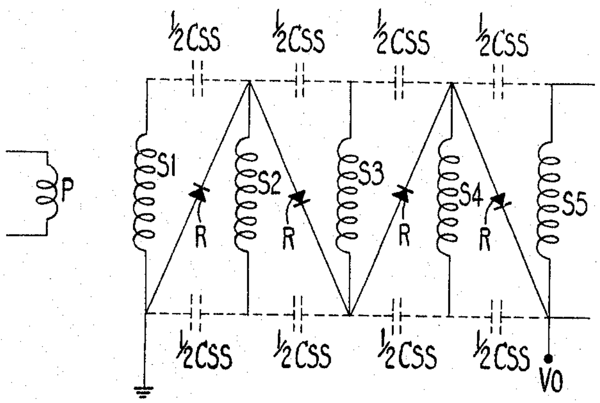
Figure 3B:
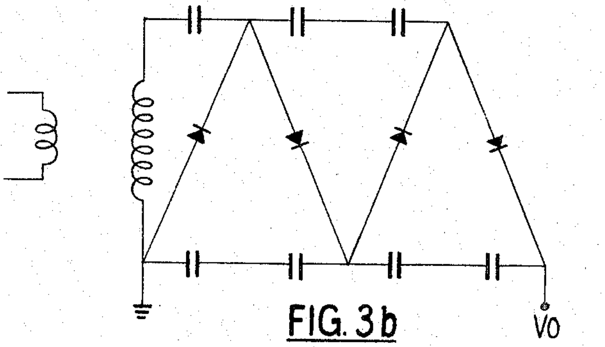
Figure 5A:
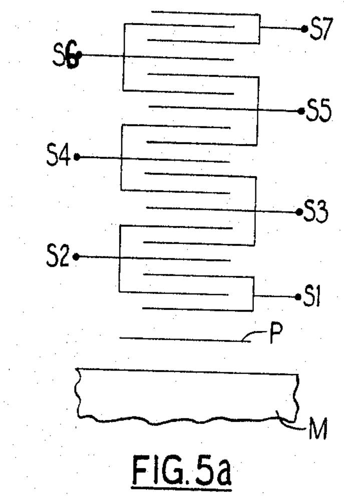
Figure 5B:
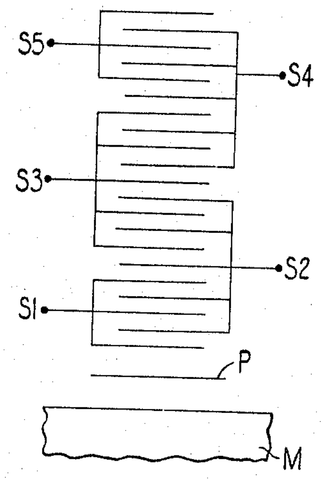
Figure 6:
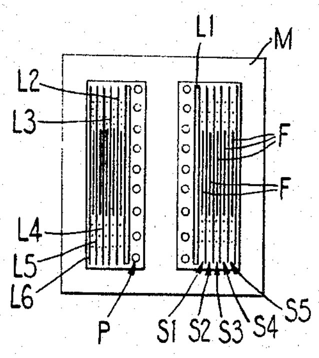
Figure 7:
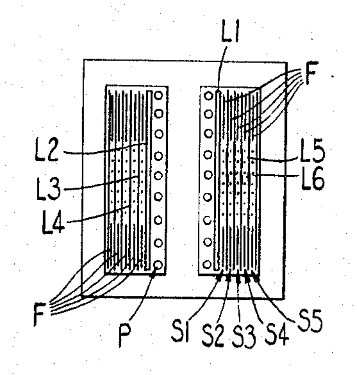
Figure 8:
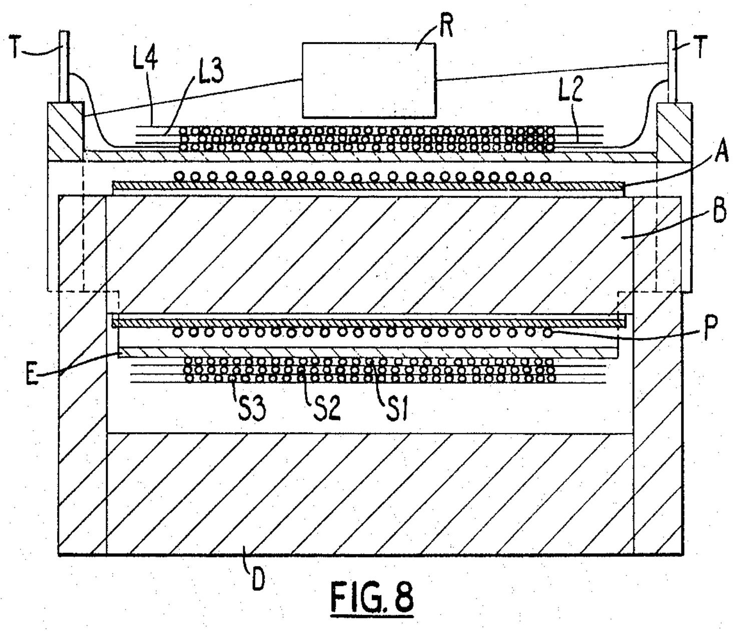
Figure 9:
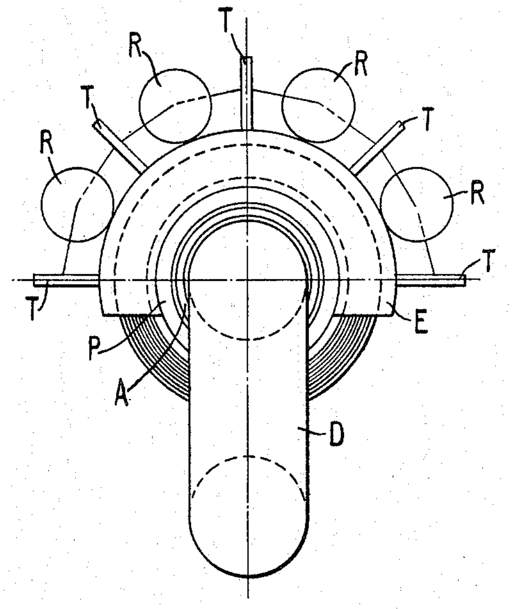
Figure 10:
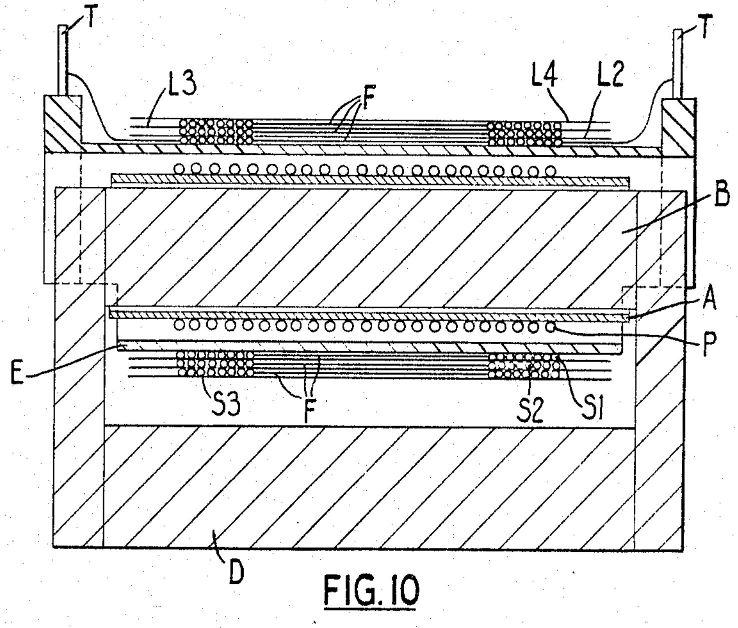
Figure 11:
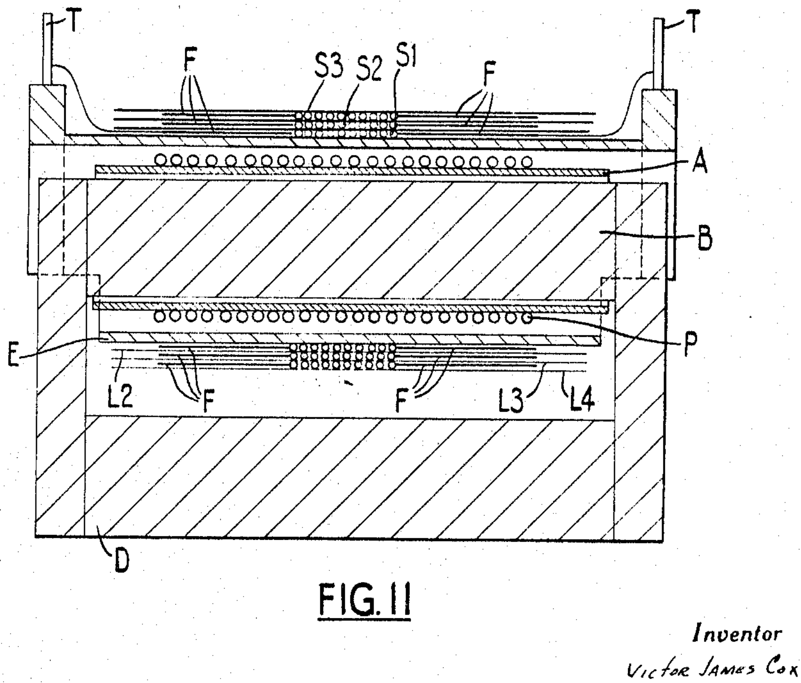
Figure 12:
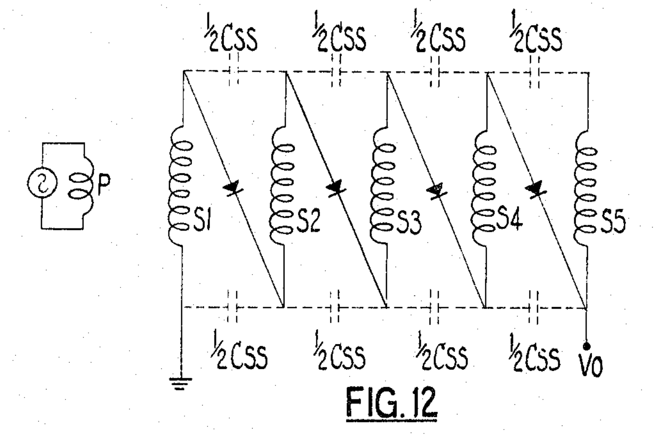
Figure 13:
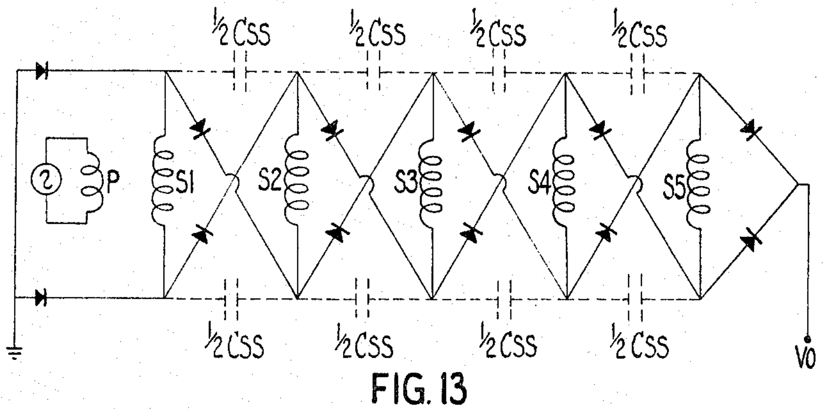
Figure 14:
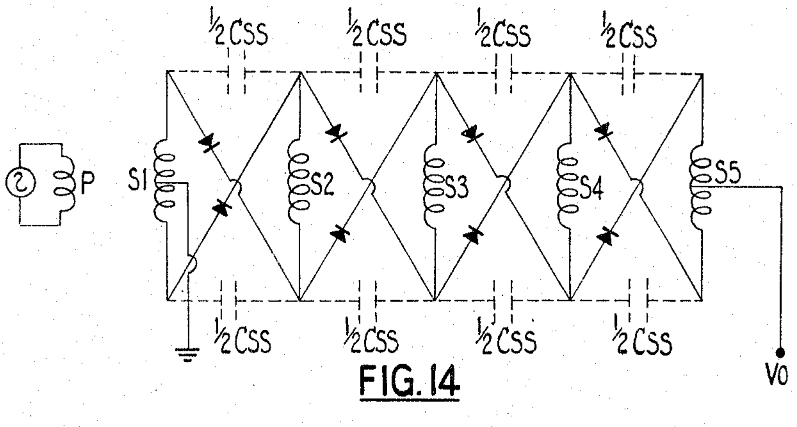

FIGURE 3*a* is a circuit diagram of one form of high voltage rectifier system according to the invention;

FIGURE 3*b* is a circuit diagram of the well-known Cockcroft/Walton high voltage rectifier system;

FIGURE 4 is a circuit diagram of an alternative form of high voltage rectifier system according to the invention;

FIGURES 5*a* and 5*b* are diagrammatic views showing how the intersecondary capacitances of the transformer of FIGURE 1 may be increased;

FIGURES 6 and 7 are schematic views of alternative forms of the transformer of FIGURE 1;

FIGURE 8 is a sectional side view of a high voltage rectifier system employing a transformer of the type disclosed in FIGURE 1;

FIGURE 9 is an end elevation of FIGURE 8;

FIGURES 10 and 11 are sectional side views of the high voltage rectifier system of FIGURE 8 having their transformers modified according to FIGURES 6 and 7 respectively;

FIGURES 12, 13 and 14 are circuit diagrams of further forms of high voltage rectifier systems according to the invention.

The transformer construction of FIGURE 1 comprises a primary winding P wound about a central limb of a magnetic core M. The primary winding may consist of one or more layers. The central limb also carries a plurality of secondary windings S1 . . . S5, each of which consists of a single layer. All of the secondary windings are wound in the same direction and occupy the same winding width. A layer L1 of relatively thick insulating material is provided between the primary winding P and the secondary winding S1 to minimise capacitance from the secondary winding S1 to the primary winding P and the central limb of the core M. Layers L2 . . . L6 of insulating material are inserted between the secondary windings S1 . . . S5. These layers are made no thicker than necessary to meet voltage stress requirements. To further increase the capacitance between the secondary windings S1 . . . S5, the magnetic core M is preferably provided with a long central limb to enable the secondary winding width to be greater than the mean diameter of the secondary windings S1 . . . S5. Also, the layers L2 . . . L6 are of a material having a high breakdown stress $(v/cm)x$ permittivity product. This construction results in a high intersecondary capacitance and also in a high ratio of self-inductance to leakage inductance. With this construction it has been found possible to design transformers whose leakage inductance is not large enough to affect significantly the operation of the rectifier system.

Figure 2:
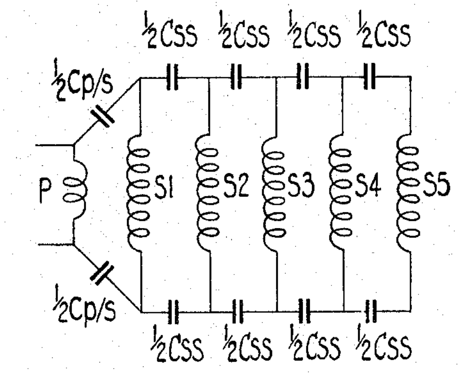
FIGURE 2 is a circuit diagram of the equivalent electric circuit of the transformer of FIGURE 1.

In this case the simplified lumped constant equivalent circuit is shown in FIGURE 2. Since the primary to single secondary voltage ratio N is normally large the $Cp/s$ capacitance is approximately equivalent to $$\frac{Cp/s}{4}N^2$$

in shunt with the primary. However in the absence of external secondary connections it will be seen that the interlayer capacitances ($Css$) bridge points are of equal A.C. potential and as such do not contribute to the equivalent shunt capacitance. This means that the total shunt capacitance referred to the primary is almost wholly determined by $Cp/s$, the stray capacitance associated with the outer secondary winding and any external connections to the secondary windings. It is essentially independent of both the number of secondary windings and the capacitance between each winding.

In order to provide a high voltage rectifier system, rectifiers R are connected between the secondary windings S1 . . . S5 as shown in FIGURE 3*a*. For comparison, the well known Cockcroft/Walton high voltage rectifier is shown in FIGURE 3*b*. It will be seen that the rectifiers R in conjunction with the secondary interwinding capacitances form a rectifier multiplier system similar to the Cockcroft/Walton multiplier but with secondary windings bridging points in the chain of nominally equal A.C. potential.

The Cockcroft/Walton multiplier normally requires large coupling capacitors as each capacitor carries both the feed current for both the rectifier to which it is connected and also for every succeeding rectifier in the chain. The capacitor size required for a given capacitor reactive voltage drop per stage depends on both the load current and the number of stages in the chains. In the system shown in FIGURE 3*a* no separate capacitors are required and because the secondary windings maintain equal A.C. potential between the two sides of the chain, the reactive drop at each stage is independent of the number of stages.

The equivalent circuit chosen (FIGURE 2) shows secondary interwinding capacitance as two lumped elements referred to each end of the secondary. The equivalent has been chosen as it gives a clear representation of the basic mode of operation of the rectifier chain. In fact this capacity is of course distributed across the whole of each pair of adjacent secondary windings and at first examination the equivalent secondary inductance in series with this capacitor might be expected to seriously modify circuit operation. This however is not a problem provided that the primary and secondary windings are tightly coupled and that the primary circuit presents a low impedance to the frequency components characteristic of the pulse current demands of the rectifiers R. If the primary circuit impedance approximates to zero, current flow via the secondary windings into the intersecondary capacitances will only be opposed by the secondary leakage inductance. Because the transformer construction requirements for maximum secondary interwinding capacity coincide with those for low leakage inductance it is not difficult to achieve a sufficiently low leakage inductance for proper rectifier operation.

FIGURE 3*a* shows a rectifier chain when $n$ ($n$=number of rectifiers) is even. In a similar manner the system can be used where $n$ is odd. Such a circuit is shown in the self explanatory FIGURE 4 which comprises an additional secondary winding S6.

In some cases it may not be possible to achieve sufficient intersecondary capacity in a single layer. In this case the secondary windings of FIGURES 3*a* and 4 can each be replaced with parallel connected groups of secondary windings as shown in FIGURES 5*a* and 5*b*. Each element of the new secondary groups is again in a single layer, individual layers of insulating material being provided between the adjacent layers of the secondary windings. The most advantageous groupings occur when the number of elements forming each secondary winding is odd. FIGURE 5*a* shows an arrangement where the intermediate secondary windings each comprise three elements and FIGURE 5*b* shows an arrangement where the intermediate secondary windings each comprise five elements. It is not essential to parallel the free ends of the secondaries as in the ideal case these carry no current, but in some cases it may reduce leakage inductance.

If it is not convenient to achieve the secondary voltage required in a single layer it is also possible to series connect the secondary elements in the grouping systems described above but in this case it is no longer possible to maintain the equivalent primary shunt capacitance independent of secondary interlayer capacitance.

An alternative method of augmenting the secondary interwinding capacity is shown in FIGURE 6. Here the secondary windings S1 . . . S5 are split in half and symmetrically disposed about and connected to individual central single turns of metallic foil F which increases the intersecondary capacitance. If each foil F provides the major part of the capacitance the open circuit end of each secondary plays little part in the circuit operation and can be omitted. The inverse of this construction is also possible (FIGURE 7), where the foils F are placed at ends of the secondary windings S1 . . . S5. In both cases the ends of the foils F must be spaced or insulated to avoid the formation of a short circuit turn.

One form of high voltage rectifier system is shown in detail in FIGURES 8 and 9. Parts corresponding to those shown in transformer of FIGURE 1 have been given the same references. The primary winding P of the transformer is wound on a former A which is mounted on a limb B of a magnetic core D. The layer L1 (FIGURE 1) is provided by a former E which surrounds the primary winding P and carries secondary windings S1, S2 and S3 and layers L2, L3 and L4. The former E and the layers L2, L3 and L4 may be of, for example, polycarbonate. Although only three secondary windings are shown, it will be appreciated that the number of secondary windings may be increased to provide the required output voltage. The secondary windings and the rectifiers R are connected to appropriate terminals T mounted in the ends of the former E. The layers L2, L3 and L4 have each been represented by a single line since they are very thin when compared with the diameter of the wire used to provide the secondary windings of the transformer.

FIGURES 10 and 11 are similar to FIGURE 8 except that the foils F have been inserted as in FIGURES 6 and 7 respectively.

While this system has significant advantages it suffers from the limitations that the alternating current circuit of each rectifier includes the series impedance of the capacitances between pairs of secondary windings.

The relatively low value of this capacitace limits the usefulness of the system to high voltage low current rectifier systems operating at high frequency, as operation at high current or low frequencies may result in a large reactive voltage drop with consequent poor voltage regulation.

This disadvantage may be readily overcome by connecting the rectifiers R as shown in FIGURE 12. It will be seen that each rectifier R is symmetrically disposed between a pair of secondary windings. If the intersecondary capacitances ($C_{ss}$) is sufficiently large each rectifier in conjunction with its associated inner secondary winding develops a D.C. voltage approximately equal to the secondary peak voltage across the upper ½ $C_{ss}$, and each rectifier in conjunction with its outer secondary winding also develops a similar voltage across the lower ½ $C_{ss}$. The mean D.C. voltages are naturally equal as the secondary windings provide a low D.C. resistance path between the equivalent lumped elements of the intersecondary capacitance.

Apart from deliberate disposition of the intersecondary capacitances this circuit consists of the series connection of a number of half wave rectifier systems. However, if such a system were constructed without such a controlled distribution of intersecondary capacitance it would be necessary to add externally at least the capacitors equivalent to either the upper or the lower chains of ½ $C_{ss}$ in order to ensure substantially equal inverse voltage distribution between the rectifier diodes. In the system proposed the minimum intersecondary capacitance for good inverse voltage distribution is quite small, as the impedance of this capacity need only be small enough to swamp the variations in reverse impedances of the rectifier diodes in the chain. If conventional winding techniques are adopted and external capacitors fitted these capacitors would need to be large enough to swamp both the rectifier reverse impedance variations and any asymmetric capacitance distribution between the transformer secondary windings.

The second important difference is that in this particular transformer construction the intersecondary capacities bridge points are of equal A.C. potential. Besides resulting in low equivalent shunt capacity this also results in a predominantly D.C. stress across the intersecondary insulation. This permits the interlayer insulation to be subjected to a high voltage stress without danger of ionization and also permits the use of insulation material which may have comparitively poor power factor at the operating frequency and temperature of the transformer.

So far the system discussed relies on the intersecondary capacities to provide the whole of the rectifier reservoir capacity. Operation in the manner described is limited to load currents which are low enough to permit the intersecondary capacities to remain charged to a large fraction of the secondary peak voltage during the intervals in which the rectifiers are non conducting. For larger load currents external reservoir capacity is required to achieve a sufficiently low ripple voltage. However a single capacitor briding the output terminals is sufficient, it is not necessary to increase the values of the intersecondary capacities which only require to be large enough to swamp rectifier reverse variations in reverse impedance between the rectifier in the chain.

If the rectifier system is used to supply large load currents it may be preferable to use a full wave system, which may be achieved by combining two recitifier chains as shown in FIGURE 4. This is equivalent to a triple full wave bridge rectifier. It is also possible to start or terminate the chain with a half bridge circuit. FIGURE 5 shows a full wave rectifier chain which both starts and terminates with half bridge circuits.

I claim:

1. A high voltage low current rectifier comprising a transformer having a plurality of secondary windings and a primary winding, said secondary windings being mounted in concentric layers about a magnetic core with said layers having substantially the same number of turns, being wound in the same direction and being of substantially equal length, the secondary windings being separated by dielectric material such that the interwinding capacities constitute at least a part of the coupling or reservoir capacitance in the rectifier, a plurality of rectifier elements connected between respective pairs of the secondary windings producing a sequence of increased voltages to output terminals of the rectifier, the above construction providing that homologous points on all said layers are maintained at substantially the same A.C. potential.

2. A rectifier according to claim 1, wherein the length of said layers is greater than the mean diameter thereof.

3. A rectifier according to claim 1, in which the said secondary windings each comprise a plurality of layers, at least some of said windings being interleaved with the layers of other secondary windings.

4. A rectifier according to claim 1, in which each of said layers is mounted in side-by-side relationship with an individual metallic foil, each said layer and its respective said foil being electrically connected to increase said interwinding capacities.

5. A rectifier according to claim 1, having a first former to support said primary winding and a second former to support said secondary windings, and a plurality of layers of insulating material to provide the dielectric material between said secondary windings.

6. A rectifier according to claim 1, having a first secondary winding, a second secondary winding adjacent to said first secondary winding and a third secondary winding adjacent to said second secondary winding, a first rectifier element connected between said first secondary winding and said second secondary winding, and a second rectifier element connected between said second secondary winding and said third secondary winding, a positive terminal and a negative terminal for each of said rectifier elements, the positive terminal of the first rectifier element and the negative terminal of the second rectifier element being connected to one end of said second secondary winding, the other ends of said first secondary winding and said third secondary winding having respectively connected thereto the negative terminal of the first rectifier element and the positive terminal of the second rectifier element.

7. A rectifier according to claim 1, having a first secondary winding, a second secondary winding adjacent to said first secondary winding and a third secondary winding adjacent to said second secondary winding, a first rectifier element connected between opposite ends of said first secondary winding and said second secondary winding, and a second rectifier element connected between opposite ends of said second secondary winding and said third secondary winding, a positive terminal and a negative terminal for each rectifier element, the positive terminals of the rectifier elements being connected to respective homologous ends of said second secondary winding and said third secondary winding, and the negative terminals of the rectifier elements being connected to respective homologous ends of said first secondary winding and said second secondary winding.

8. A rectifier according to claim 1, having a plurality of pairs of adjacent secondary windings with each pair comprising an inner winding and an outer winding, and intermediate secondary windings constituting an inner winding for one pair of secondary windings and an outer winding for an adjacent pair of secondary windings, a first rectifier element and a second rectifier element for each pair of secondary windings, a positive terminal and a negative terminal for each rectifier element and a start end and a finish end for each secondary winding, each first rectifier element being connected between the start end of its respective inner winding and the finish end of its respective outer winding while each second rectifier element is connected between the finish end of its respective inner winding and the start end of its respective outer winding, the ends of said rectifier elements connected to their respective inner windings all being of the same polarity.

9. A rectifier according to claim 8, having an output terminal connected to a centre tapping on the innermost secondary winding.

10. A rectifier according to claim 8, having an output terminal connected to a centre tapping on the outermost secondary winding.

11. A rectifier according to claim 8, having a pair of reversely connected rectifier elements serially connected between the ends of the innermost secondary winding and an output terminal connected to the junction of the pair of rectifier elements, in which the terminals of the pair of rectifier elements connected to said innermost secondary winding are of opposite polarity to the terminals of the respective said first and second rectifier elements connected thereto.

12. A rectifier according to claim 8, having a pair of reversely connected rectifier elements serially connected between the ends of the outermost secondary winding and an output terminal connected to the junction of the pair of rectifier elements, in which the terminals of the pair of rectifier elements connected to said outermost secondary winding are of opposite polarity to the terminals of the respective said first and second rectifier elements connected thereto.

References Cited

UNITED STATES PATENTS

| | | | |
|---|---|---|---|
| 2,619,602 | 11/1952 | Walker et al. | 321—15 X |
| 3,292,073 | 12/1966 | Jones et al. | 321—15 |
| 3.320,513 | 5/1967 | Cleland | 321—15 |

FOREIGN PATENTS 931,540 8/1955 Austria.

OTHER REFERENCES

German printed application, 1,051,378, Feb. 26, 1959.

JOHN F. COUCH, *Primary Examiner.*

WM. SHOOP, *Assistant Examiner.*